(12) United States Patent
Becker et al.

(10) Patent No.: US 7,251,257 B2
(45) Date of Patent: Jul. 31, 2007

(54) METHOD AND SYSTEM FOR TRANSMITTING QUALITY CRITERIA OF A SYNCHRONOUS NETWORK HIERARCHY

(75) Inventors: Wolfgang Becker, Olching (DE); Wolfgang Drews, Grobenzell (DE)

(73) Assignee: Siemens Aktiengesellschaft, Munich (DE)

( * ) Notice: Subject to any disclaimer, the term of this patent is extended or adjusted under 35 U.S.C. 154(b) by 1078 days.

(21) Appl. No.: 10/216,150

(22) Filed: Aug. 9, 2002

(65) Prior Publication Data

US 2003/0031212 A1   Feb. 13, 2003

(30) Foreign Application Priority Data

| Aug. 9, 2001 | (DE) | ................................. 101 39 144 |
| Aug. 23, 2001 | (DE) | ................................. 101 41 361 |
| Feb. 5, 2002 | (DE) | ................................. 102 04 618 |

(51) Int. Cl.
  *H04J 3/02*   (2006.01)

(52) U.S. Cl. .................................... 370/537

(58) Field of Classification Search ................ 370/313, 370/537–539, 389, 400, 226, 466, 907, 228, 370/289, 395, 473, 469; 709/239, 224, 201, 709/238, 223, 221
See application file for complete search history.

(56) References Cited

U.S. PATENT DOCUMENTS

| 5,712,845 A | * | 1/1998 | Peltomaki | .................... 370/226 |
| 6,094,682 A | * | 7/2000 | Nagasawa | .................... 709/224 |

* cited by examiner

*Primary Examiner*—Chi Pham
*Assistant Examiner*—Prenell Jones
(74) *Attorney, Agent, or Firm*—Bell, Boyd & Lloyd LLP

(57) ABSTRACT

A method and system are provided for transmitting quality criteria of tributary signals of a synchronous network hierarchy such as SDH or SONET, which, at the transmitting end are combined to form a higher-order multiplex signal and are transmitted in a higher-order transport module via a synchronous network. In this case, the tributary signals are monitored and different tributary quality criteria about the state of each of the tributary signals are generated. The tributary quality criteria are combined to form monitoring combinations and inserted into the overhead of the higher-order transport module to be transmitted.

9 Claims, 2 Drawing Sheets

METHOD AND SYSTEM FOR TRANSMITTING QUALITY CRITERIA OF A SYNCHRONOUS NETWORK HIERARCHY

BACKGROUND OF THE INVENTION

Digital signals are transmitted via synchronous networks, corresponding to the SDH or SONET standard. In this case, the useful data are transmitted with a so-called STM-1 transport module. The latter includes the useful data and additional overhead information.

A number of lower-order STM-M signals, such as, for example, STM-1, are combined by time division multiplexing to form a higher-order STM-N signal, in order to achieve efficient channel utilization. In this case, the overheads of the lower-order STM-M signals are evaluated and a new overhead of the higher-order STM-N signal is formed.

Overhead information and signal defects, such as alarm messages and bit errors which are contained in the incoming tributary signal (STM-M), are transmitted non-transparently in a conventional SDH/SONET system, since this is not provided according to the SDH/SONET standard due to the termination of line sections.

However, in contrast to the standard method, the operator of a transport network demands that data channels that are as transparent as possible be made available to its customers.

Such a transparent method for SDH/SONET signals has not yet been standardized at the present time.

An object to which the present invention is directed consists in transmitting overhead information and signal defects of lower-order SDH/SONET signals via a higher-order SDH/SONET multiplex signal.

A further object of the present invention is to evaluate the signal defects of the tributary signals and the signal defects of the higher-order multiplex signal and assign them to the associated outgoing tributary signals.

SUMMARY OF THE INVENTION

Accordingly, in an embodiment, the present invention provides for a method, and associated system, for transmitting quality criteria of a number of tributary signals of a synchronous network hierarchy, wherein the method includes the steps of: combining, at a transmitting end, the number of tributary signals to form a higher-order multiplex signal; monitoring the tributary signals; generating different tributary quality criteria about a state of each of the tributary signals; combining the tributary quality criteria of each of the tributary signals to form a respective monitoring combination; inserting the monitoring combinations into an overheard of a higher-order transport module to be transmitted; and transmitting the number of tributary signals as the higher-order multiplex signal in the higher-order transport module via a synchronous network.

The particular advantages achieved via the present invention are that quality criteria of the tributary signals, such as alarms, bit errors and performance values and quality criteria of the higher-order multiplex signal are linked with one another to form resulting quality criteria and assigned to the corresponding outgoing tributary signals, so that the quality features that are output correspond to the actual quality influencing on the tributary path and the multiplex path.

A correspondingly designed SDH/SONET system is referred to as multiplex transponder below.

Additional features and advantages of the present invention are described in, and will be apparent from, the following Detailed Description of the Invention and the Figures.

BRIEF DESCRIPTION OF THE INVENTION

DETAILED DESCRIPTION OF THE INVENTION

Figure 1:
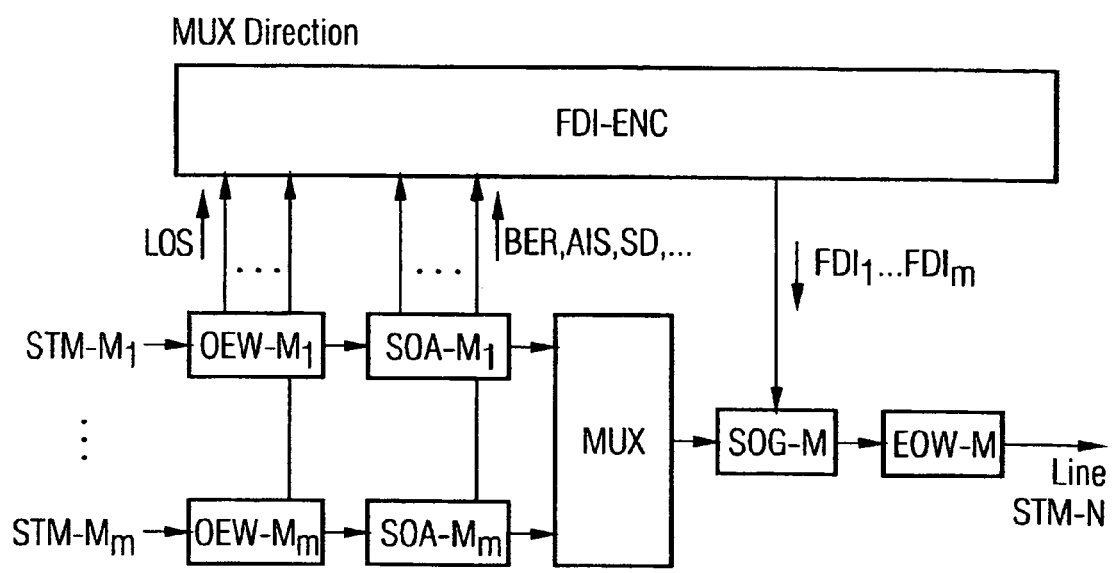
FIG. 1 shows the basic circuit diagram of an SDH/SONET multiplexer.

FIG. 1 shows the basic circuit diagram of an SDH/SONET multiplexer for the transmission of quality criteria of low-order tributary signals $STM-M_1 \ldots STM-M_m$, for example $STM-1_1 \ldots STM-1_m$, of a synchronous network hierarchy such as SDH or SONET.

In the transmitting direction, the low-order tributary signals $STM-M_1 \ldots STM-M_m$ are fed to opto-electrical transducers OEW-M1 ... OEW-Mm. The opto-electrical transducers OEW-M1 ... OEW-Mm contain monitoring devices (not illustrated) which check the level of the tributary signals $STM-M_1 \ldots STM-M_m$ and output a first quality feature TQK1; for example, the failure of the input signal, called LOS. The electrical tributary signals $STM-M_1 \ldots STM-M_m$ are fed to overhead evaluators SOA M1 ... Mm, which check the signals $STM-M_1 \ldots STM-M_m$ and, as the result of the check, output further quality features TQK2 ... TQKm; for example, a loss of synchronization, called LOF, the presence of an alarm indication signal, called AIS, a slightly increased bit error rate, called SD, or greatly increased bit error rate, called EXC, and the bit error rate, called BER itself.

The evaluated tributary signals $STM-M_1 \ldots STM-M_m$ are fed to a multiplexer MUX and combined to form a higher-order multiplex signal STM-N.

The quality features ascertained by the opto-electrical transducers OEW-M1 ... OEW-Mm and overhead evaluators SOA-M1 ... SOA-Mm are fed to a quality criteria encoder FDI-Enc, which combines these quality features for each tributary signal $STM-1_1 \ldots STM-1_m$ as monitoring combination FDI1 ... FDIm and outputs the latter to the overhead generator SOG-M, which inserts the latter into the overhead of the higher-order multiplex signal STM-N to be transmitted. In this case, an SDH/SONET signal which essentially corresponds to the SDH/SONET standard, but is supplemented with additional information, is produced and transmitted via an overhead generator SOG-M and an electro-optical transducer EOW-M.

This signal is transmitted to an SDH/SONET demultiplexer. Further disturbances may occur during the transmission and likewise must be taken into account.

Figure 2:
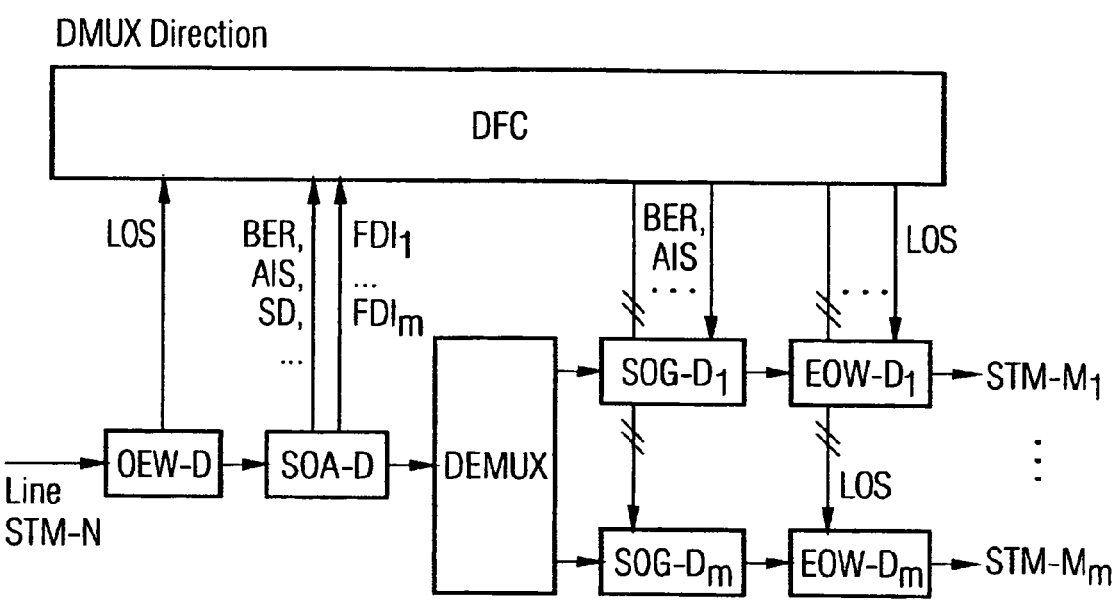
FIG. 2 shows the basic circuit diagram of an SDH/SONET demultiplexer.

FIG. 2 shows the basic circuit diagram of the SDH/SONET demultiplex transponder for determining resulting tributary quality criteria of the tributary signals $STM-M_1 \ldots STM-M_m$. The resulting tributary quality criteria for the output-side tributary signals are determined by a combination of the tributary quality criteria and the multiplex signal quality criteria.

The higher-order multiplex signal STM-N is fed to an opto-electrical transducer OEW-D. The latter contains a monitoring device (not illustrated) which affects the level of the higher-order multiplex signal STM-N and outputs a first multiplex signal quality criterion MQK1; for example, the failure of the multiplex signal STM-N, designated by MLOS, for short. The converted signal is fed to an overhead evaluator SOA-D, which checks the signal and outputs further quality features MQK2 ... MQKn of the multiplex signal STM-N, such as loss of synchronization MLOF, the presence of an alarm indication signal MAIS, a slightly increased bit error rate MSD or greatly increased bit error rate MEXC and the bit error rate MBER itself.

In the overhead evaluator SOA-D, moreover, the overhead of the higher-order multiplex signal STM-N is checked, and the monitoring combinations FDI1 . . . FDIm inserted by the input-side multiplex transponder are read out.

The multiplex signal STM-N is fed to a demultiplexer Demux, which divides it into tributary signals STM-$M_1$ . . . STM-$M_m$.

The quality features MQK1 . . . MQKn of the higher-order multiplex signal STM-N that are ascertained by the opto-electrical transducer OEW-D and by the overhead evaluator SOA-D and the monitoring combinations FDI1 . . . FDIm read out from the overhead evaluator SOA-D are fed to a defect combiner DFC. The latter determines from the quality criteria MQK1 . . . MQKm of the multiplex signal STM-N quality features for each transmitted tributary signal STM-$M_1$ . . . STM-$M_m$ and links these with the monitoring combinations FDI1 . . . FDIm to form resulting quality criteria RTQK1 . . . RTQKm for each tributary signal STM-$M_1$ . . . STM-$M_m$.

A subset of the resulting quality criteria RTQK1 . . . RTQKi is fed to the overhead generators SOG-D1 . . . SOG-Dm, which insert these resulting quality criteria RTQK1 . . . RTQKi, in each case, into the overhead of the corresponding tributary signal STM-$M_1$ . . . STM-$M_m$ or output an alarm indication signal AIS.

Further quality criteria RTQKj . . . RTQKm are fed to the electro-optical transducers EOW-D1 . . . EOW-Dm, which, if appropriate, suppress the transmission of the tributary signal.

The tributary signals that are correspondingly provided with resulting quality criteria are transmitted to the customers via electro-optical transducers EOW-D1 . . . EOW-Dm.

The determination of a resulting bit error rate is described in the following example.

At the transmitting end, the bit error rate BER1 . . . BERm of each incoming tributary signal STM-$M_1$ . . . STM-$MM_m$ is determined (in the input-side multiplex transponder) in each overhead evaluator SOA-M1 . . . SOA-Mm and is output to the quality criteria encoder FDI-Enc, which inserts this and further quality features into monitoring combinations FDI1 . . . FDIm which are transmitted.

At the receiving end (in the output-side demultiplex transponder), the bit error rate M-BER of the higher-order multiplex signal STM-N or, in each case, the bit error rate M-BERT1 . . . M-BERTm of the transmitted tributary signals is determined in the overhead evaluator SOA-D, such as by evaluation of B2 parity bits, and is output to the defect combiner DFC.

In addition, in the overhead evaluator SOA-D, the monitoring combinations FDI1 . . . FDIm are read out from the overhead of the multiplex signal STM-N and output to the defect combiner DFC.

The defect combiner DFC links the bit error rates M-BER or M-BERT1 . . . M-BERTm with the bit error rates BER1 . . . BERm transmitted in the monitoring combination to form a resulting bit error rate R-BER1 . . . R-BERm for each tributary signal STM-$M_1$ . . . STM-$M_m$. The resulting bit error rate R-BER1 . . . R-BERm is output to the overhead generators SOG-D1 . . . SOG-Dm, which insert them into the overhead of the tributary signals STM-$M_1$ . . . STM-$M_m$ to be transmitted; for example, through targeted corruption of the B1/B2 parity bytes.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmitting quality criteria of a plurality of tributary signals of a synchronous network hierarchy, the method comprising the steps of:
    combining, at a transmitting end, the plurality of tributary signals to form a higher-order multiplex signal;
    monitoring the tributary signals;
    generating different tributary quality criteria about a state of each of the tributary signals;
    combining the tributary quality criteria of each of the tributary signals to form a respective monitoring combination;
    inserting the monitoring combinations into an overhead of a higher-order transport module to be transmitted; and
    transmitting the plurality of tributary signals as the higher-order multiplex signal in the higher-order transport module via a synchronous network.

2. A method for transmitting quality criteria of a plurality of tributary signals as claimed in claim 1, wherein the tributary quality criteria is at least one of an absence of a tributary signal, a loss of frame synchronicity, reception of an alarm indication signal, a slightly increased bit error rate, a greatly increased bit error rate and the bit error rate itself.

3. A method for determining resulting tributary quality criteria of a plurality of tributary signals, which are combined to form a higher-order multiplex signal, are transmitted as the higher-order multiplex signal via a synchronous network and, at a receiving end, are divided into a plurality of tributary signals, the method comprising the steps of:
    monitoring the transmitted higher-order multiplex signal at the receiving end;
    generating a plurality of multiplex signal quality criteria about a state of the received higher-order multiplex signal;
    evaluating the received monitoring combinations; linking, in each case, both the tributary quality criteria recovered from a monitoring combination and the multiplex signal quality criteria determined;
    generating resulting tributary quality criteria; and
    evaluating the resulting tributary quality criteria and/or inserting the resulting tributary quality criteria into the overhead and/or the payload of each tributary signal to be forwarded, or interrupting the transmission of a tributary signal or transmitting an alarm indication signal.

4. A method for determining resulting tributary quality criteria as claimed in claim 3, wherein the multiplex signal quality criteria is at least one of an absence of the higher-order multiplex signal, a loss of frame synchronicity, reception of an alarm indication signal, a slightly increased bit error rate, a greatly increased bit error rate and the bit error rate itself.

5. A method for determining resulting tributary quality criteria as claimed in claim 4, the method further comprising the step of additively linking the bit error rate of the higher-order multiplex signal and the bit error monitoring combination of each tributary signal to form resulting tributary signal bit error rates.

6. A method for determining resulting tributary quality criteria as claimed in claim 5, wherein the bit error rate is determined individually for each tributary signal transmitted in the multiplex signal.

7. A method for determining resulting tributary quality criteria as claimed in claim 4, wherein the multiplex signal quality criteria and the tributary signal quality criteria which identify a signal failure are combined to form a resulting first alarm signal.

8. A system for transmitting quality criteria of a plurality of tributary signals of a synchronous network hierarchy, comprising:
   a multiplex device;
   opto-electrical transducers;
   section overhead evaluators;
   a transmitting-end overhead generator;
   an electro-optical transducer; and
   a quality criteria encoder;
   wherein the multiplex device, to whose inputs the plurality of tributary signals are fed via, as required, the opto-electrical transducers and the section overhead evaluators, combines the plurality of tributary signals to form a higher-order multiplex signal and inserts the higher-order multiplex signal into a transport module;
   wherein the transmitting-overhead generator is connected to an output of the multiplex device and to the electro-optical transducer positioned downstream of the transmitting-end overhead generator;
   wherein the electro-optical transducer converts the transport module to be transmitted into an optical signal;
   wherein the opto-electrical transducers and receiving-end overhead evaluators each have a monitoring device which outputs a first tributary quality criterion about a state of one of the plurality of tributary signals, and each section overhead evaluator determines further tributary quality criteria; and
   wherein the first and the further quality criteria are fed to the quality criteria encoder which combines and outputs the first and the further quality criteria at an output as a monitoring combination which is inserted into an overhead of the transport module to be transmitted in the transmitting-end overhead generator.

9. A system for determining resulting tributary quality criteria of a plurality of tributary signals of a synchronous network hierarchy, comprising:
   a demultiplex device;
   opto-electrical transducers;
   section overhead evaluators;
   a transmitting-end overhead generator;
   an electro-optical transducer; and
   a quality criteria encoder;
   wherein the demultiplex device, to whose input a higher-order multiplex signal is fed via a receiving-end opto-electrical transducer and a receiving-end overhead evaluator, divides the higher-order multiplex signal into the plurality of tributary signals and inserts the plurality of tributary signals into a plurality of transport modules;
   wherein the plurality of transmitting-end overhead generators are connected to outputs of the demultiplex device and, as required, electro-optical transducers connected downstream;
   wherein the receiving-end opto-electrical transducer includes a monitoring device which outputs a first multiplex signal quality criterion about a state of the higher-order multiplex signal;
   wherein the receiving-end overhead evaluator includes a monitoring device which determines further multiplex signal quality criteria and includes a read-out device which outputs monitoring combinations inserted into the higher-order multiplex signal;
   wherein the first and the further quality criteria and the read-out monitoring combinations are fed to the defect combiner which evaluates and links them for each transmitted tributary signal, and generates a resulting quality criterion for each tributary signal; and
   wherein the resulting tributary quality criteria are fed to each tributary overhead generator which inserts the resulting tributary quality criterion into an overhead of the tributary signal to be transmitted, or prevents transmission of the tributary signal, or transmits an alarm indication signal.

* * * * *